United States Patent
Goryachev et al.

(10) Patent No.: US 9,710,427 B2
(45) Date of Patent: Jul. 18, 2017

(54) VERIFICATION OF DISTRIBUTED SYMMETRIC MULTI-PROCESSING SYSTEMS

(71) Applicants: Alex Goryachev, Haifa (IL); Ronny Morad, Kiriat Ata (IL); Tali Rabetti, Haifa (IL); Sergey Shusterman, Haifa (IL)

(72) Inventors: Alex Goryachev, Haifa (IL); Ronny Morad, Kiriat Ata (IL); Tali Rabetti, Haifa (IL); Sergey Shusterman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 14/709,491

(22) Filed: May 12, 2015

(65) Prior Publication Data
US 2015/0242359 A1    Aug. 27, 2015

Related U.S. Application Data

(62) Division of application No. 13/517,621, filed on Jun. 14, 2012.

(51) Int. Cl.
| | |
|---|---|
| G06F 9/30 | (2006.01) |
| G06F 15/00 | (2006.01) |
| G06F 15/173 | (2006.01) |
| G06F 15/167 | (2006.01) |
| G06F 9/50 | (2006.01) |
| G06F 13/16 | (2006.01) |

(52) U.S. Cl.
CPC ...... *G06F 15/17331* (2013.01); *G06F 9/5077* (2013.01); *G06F 13/1663* (2013.01); *G06F 15/167* (2013.01)

(58) Field of Classification Search
None
See application file for complete search history.

(56) References Cited

U.S. PATENT DOCUMENTS

| | | | | |
|---|---|---|---|---|
| 5,511,219 | A * | 4/1996 | Shimony | G06F 9/30167 712/35 |
| 5,596,764 | A * | 1/1997 | Intrater | G06F 9/30167 712/227 |
| 6,785,773 | B2 * | 8/2004 | Farago et al. | 711/141 |
| 7,197,576 | B1 * | 3/2007 | Lo | H04L 29/06 710/2 |

(Continued)

OTHER PUBLICATIONS

Meixner et. al., "Dynamic Verification of Memory Consistency in Cache-Coherent Multithreaded Computer Architectures", IEEE Transactions on Dependable and Secure Computing, vol. 6, Issue 1, pp. 18-31, Jan.-Mar. 2009.

*Primary Examiner* — Corey S Faherty
(74) *Attorney, Agent, or Firm* — Ziv Glazberg

(57) ABSTRACT

A method, apparatus and product useful for verifying Distributed Symmetric Multi-Processing systems (DSMPs). The method comprising: determining one or more sub-systems of a DSMP, wherein each sub-system is a Symmetric Multi-Processing System (SMP) which comprises a shared memory and a set of processing entities that have the same access permissions to the shared memory; and verifying the DSMP using a verification tool designed to verify an SMP, wherein said verifying is performed by verifying each sub-system.

5 Claims, 6 Drawing Sheets

(56) References Cited

U.S. PATENT DOCUMENTS

| | | | |
|---|---|---|---|
| 7,296,133 B2* | 11/2007 | Swanberg | 711/173 |
| 7,756,943 B1* | 7/2010 | Wong | G06F 9/00 |
| | | | 709/212 |
| 2011/0125974 A1* | 5/2011 | Anderson | 711/153 |

* cited by examiner

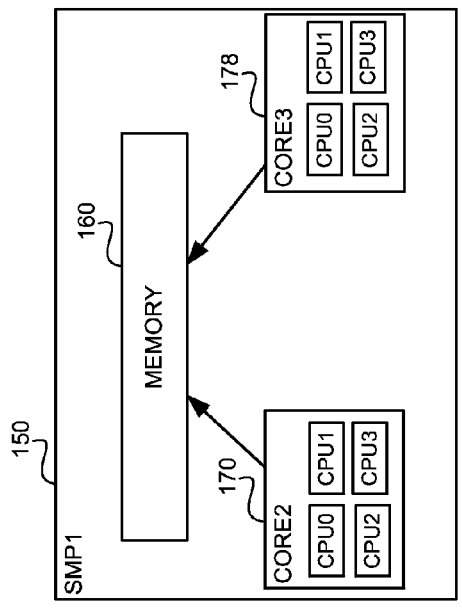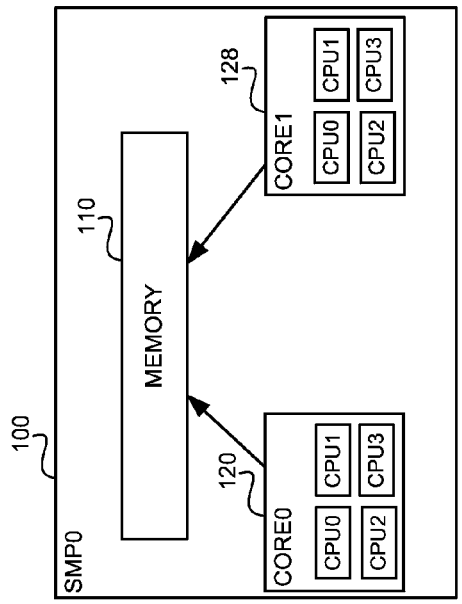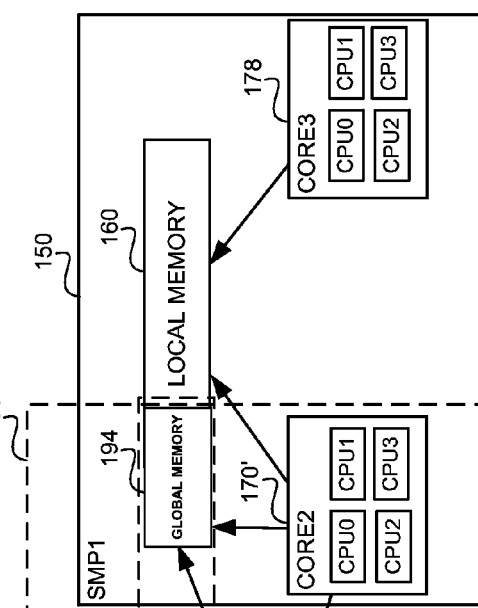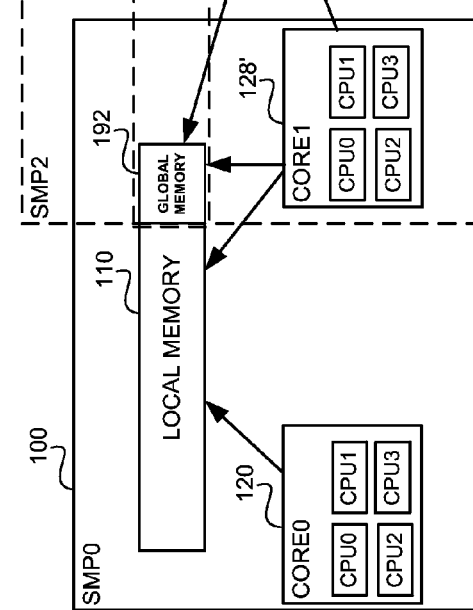
FIG. 1A
FIG. 1B

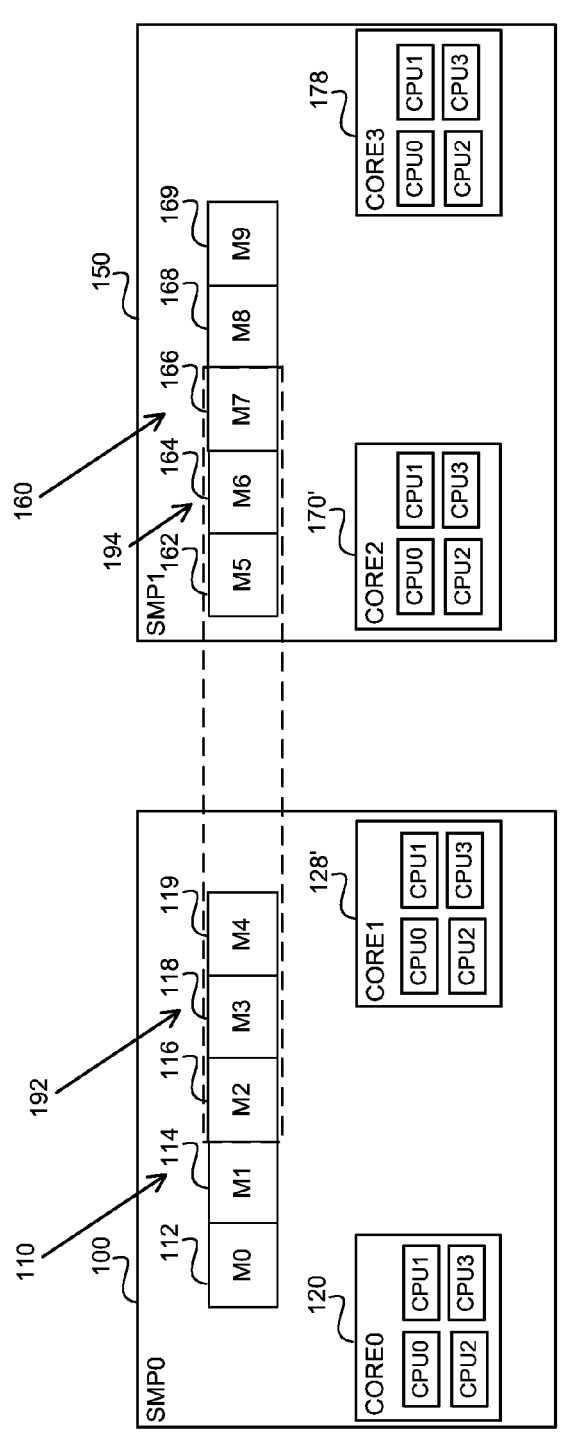
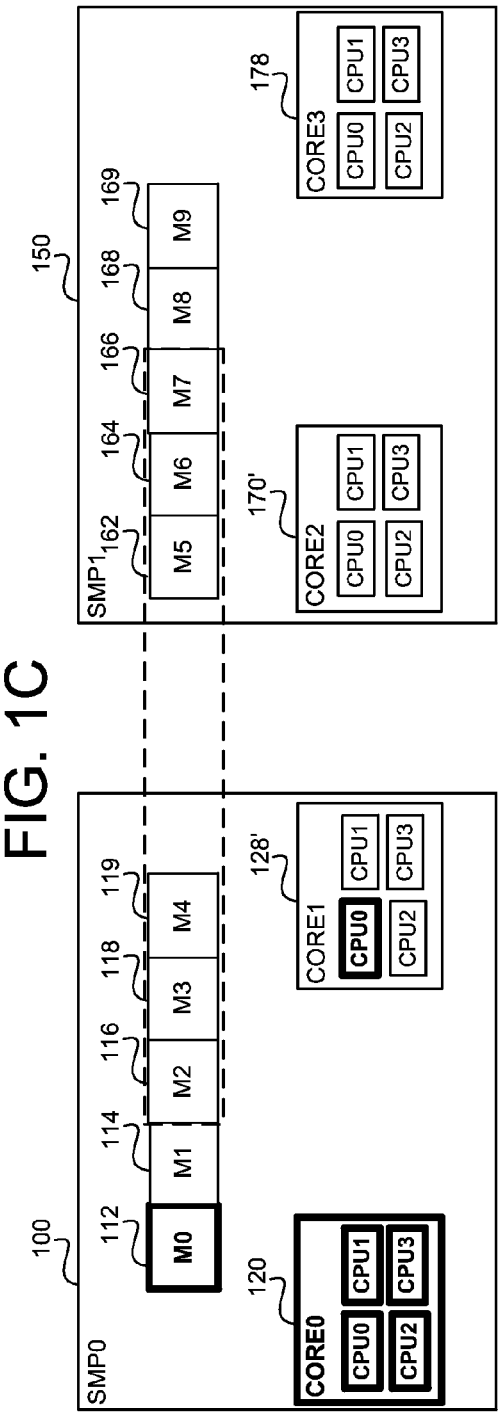
FIG. 1C
FIG. 1D

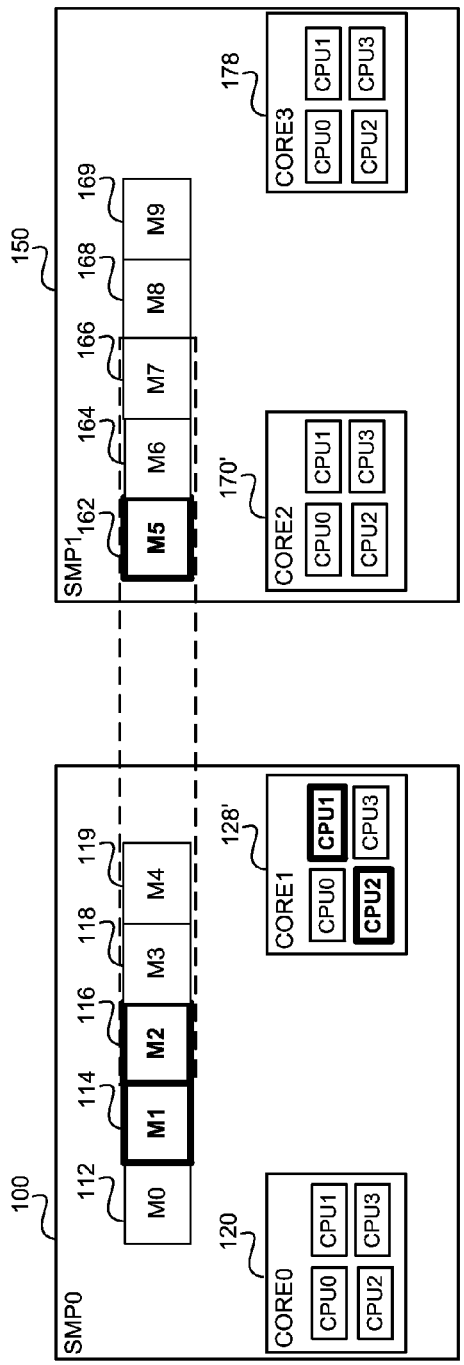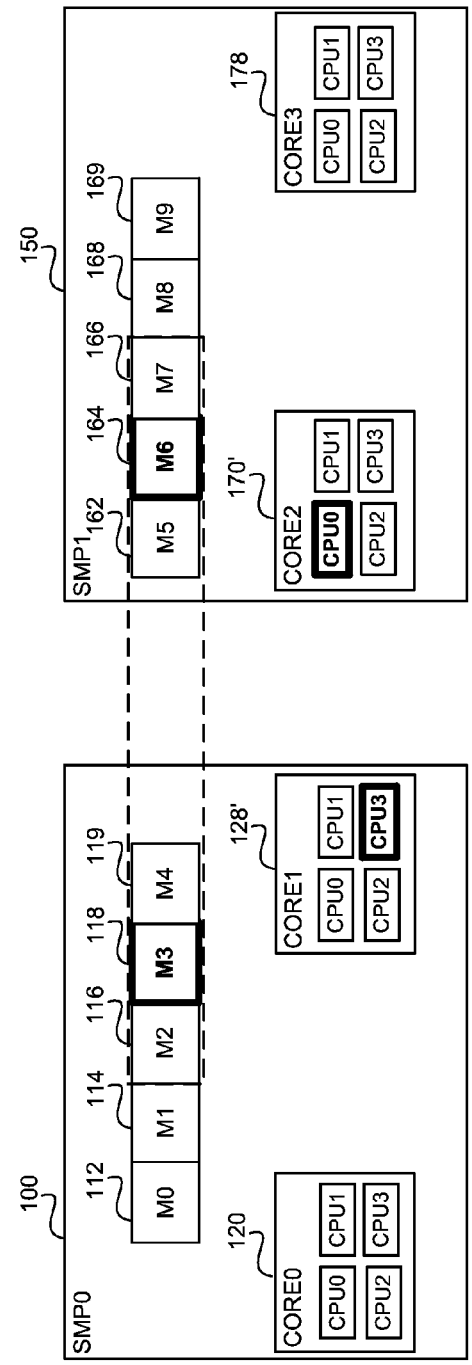

VERIFICATION OF DISTRIBUTED SYMMETRIC MULTI-PROCESSING SYSTEMS

CROSS-REFERENCE TO RELATED APPLICATIONS

This application is a divisional application of and claims the benefit of U.S. non-provisional application Ser. No. 13/517,621 filed Jun. 14, 2012, which is hereby incorporated by reference in its entirety.

TECHNICAL FIELD

The present disclosure relates to Distributed Symmetric Multi-Processing Systems in general, and to quality assurance of Distributed Symmetric Multi-Processing Systems systems, in particular.

BACKGROUND

A Symmetric Multi-Processing (SMP) system is generally a multiprocessor computer hardware architecture where two or more identical processors are connected to a single shared main memory. The processors are symmetric in the sense that each processor is identical and each has full access to the entire memory. Most common multiprocessor systems today use SMP architecture. In the case of multi-core processors, the SMP architecture applies to the cores, treating them as separate processors. Processors may be interconnected using buses, crossbar switches, on-chip mesh networks, or using other communication link. Generally, in systems with more than one SMP, each SMP does not have direct access to the memories of the other SMPs.

A multi-SMP system is comprised of a plurality of SMP nodes, each of which is an SMP in itself.

A Distributed SMP system (DSMP) is an extension of a multi-SMP system, where a new SMP. also referred to as a logical SMP, is formed by a subset of the processors of two or more existing SMPs. The memory of the new SMP may be comprised of portions of the memories of each of the existing SMPs. Other processors, which are not part of the new SMP, may be restricted from accessing the memory of the new SMP. The processors which participate in both SMPs (i.e., existing SMP and new SMP), may have direct access to the memory of the existing SMP as well as to that of the new SMP.

While the DSMP is generally configured based on a plurality of SMP nodes, each hardware component is not symmetric by itself. For example, in an SMP node, some of the processors have access to the memory of both the SMP node and the new SMP, while other processors can access only the memory of the SMP nodes.

BRIEF SUMMARY OF THE INVENTION

One exemplary embodiment of the disclosed subject matter is a computer-implemented method performed by a computer having a processor and memory, comprising: determining one or more sub-systems of a Distributed Symmetric Multi-Processing system (DSMP), wherein each sub-system is a Symmetric Multi-Processing System (SMP) which comprises a shared memory and a set of processing entities that have the same access permissions to the shared memory; and verifying the DSMP using a verification tool designed to verify an SMP, wherein said verifying is performed by verifying each sub-system.

Another exemplary embodiment of the disclosed subject matter is a computerized apparatus having a processor, the processor being adapted to perform the steps of: determining one or more sub-systems of a Distributed Symmetric Multi-Processing system (DSMP), wherein each sub-system is a Symmetric Multi-Processing System (SMP) which comprises a shared memory and a set of processing entities that have the same access permissions to the shared memory; and verifying the DSMP using a verification tool designed to verify an SMP, wherein said verifying is performed by verifying each sub-system.

Yet another exemplary embodiment of the disclosed subject matter is a computer program product comprising: a non-transitory computer readable medium retaining program instructions, which instructions when read by a processor, case the processor to performs the steps of: determining one or more sub-systems of a Distributed Symmetric Multi-Processing system (DSMP), wherein each sub-system is a Symmetric Multi-Processing System (SMP) which comprises a shared memory and a set of processing entities that have the same access permissions to the shared memory; and verifying the DSMP using a verification tool designed to verify an SMP, wherein said verifying is performed by verifying each sub-system.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1A shows an illustration of a multi SMP system, in accordance with some exemplary embodiments of the disclosed subject matter;

FIG. 1B shows an illustration of a DSMP, in accordance with some exemplary embodiments of the disclosed subject matter;

FIG. 1C-1H show partitioning of a DSMP into sub-systems, in accordance with some exemplary embodiments of the disclosed subject matter;

DETAILED DESCRIPTION

Figure 1G:
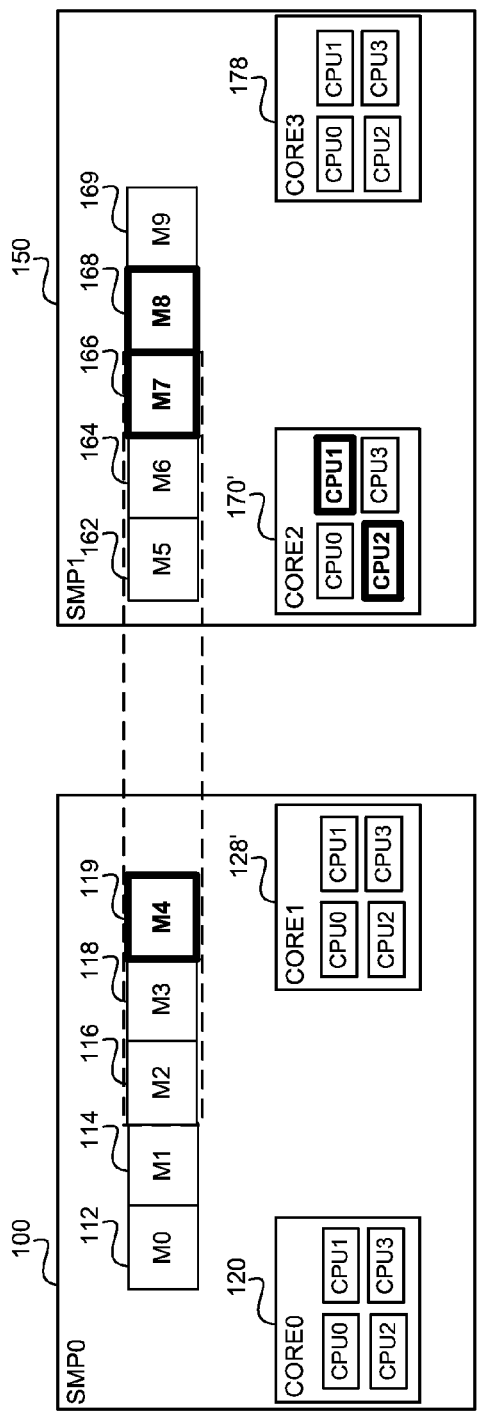

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In some exemplary embodiments, an "SMP" is a multi-processor computer hardware architecture having two or more processing entities that have the same access permissions to a memory. The processing entities have a direct access to the memory, such as using an Ethernet link, an InfinBand link, a bus, a crossbar switch, an on-chip mesh network, or the like. The SMP is said to be symmetric as all processing entities have the same access permissions.

In some exemplary embodiments, a "DSMP" is a distributed multiprocessor computer hardware architecture comprising two or more SMP nodes. Each SMP node has processing entities and a memory. The DSMP may define a logical SMP which comprises portions of two or more SMP nodes. The logical SMP includes processing entities from different SMP nodes and portions of the memories of the different SMP nodes. As opposed to a Multi-SMP system, which is a combination of several SMP nodes, in a DSMP processing entities of a first SMP node may be capable of directly accessing the memory of a second SMP node.

Processing entities of an SMP node are said to be "pivot processing entities" if they participate in two or more SMPs, such as in an SMP node and in a logical SMP, or "non-pivot processing entities" if they are not included by the logical SMP. Additionally or alternatively, a pivot processing entity is any processing entity comprised by a logical SMP.

Memory portions which are included in the logical SMP are referred to as "global memory" and the portions which are not included in the logical SMP are "private memory".

For simplicity, the disclosed subject matter is described with respect to a DSMP that defines a single logical SMP and that comprises two SMP nodes. However, the disclosed subject matter is not limited to such embodiments, and may include several logical SMPs and any number of SMP nodes.

It will be noted that the SMP nodes of the DSMP may not exhibits the symmetry property, as pivot processing entities have different access permissions than non-pivot processing entities, such as non-pivot processing entities may not access the global memory. Additionally or alternatively, pivot processing entities may access both global memory and local memory in their SMP node as well as the global memory of the logical SMP that includes them which is comprised by a different SMP node.

A "processing entity" is a hardware compound that is capable of performing computation. In some exemplary embodiments, the processing entity may be a processor, a Central Processing Unit (CPU), a microprocessor, an electronic circuit, an Integrated Circuit (IC) or the like. In some exemplary embodiments, the processing entity may be a core used in multi-core processors. Additionally or alternatively, the processing entity may be a hardware thread. In some exemplary embodiments, there may be a hierarchy of processing entities, such as the SMP node may comprise a set of cores; each core may comprise a set of processors (also referred to as CPUs); each CPU may comprise hardware threads capable of independent processing. Each type of processing entity is capable of independent processing that does not depend on processing entities of the same type but may utilize processing entities from lower-level hierarchies (e.g., the core performs processing using the CPUs of the core).

One technical problem dealt with by the disclosed subject matter is to perform verification on the DSMP using existing verification tools which are useful for verifying SMPs and/or Multi-SMP systems. Using the existing verification tool, also referred to as Verification IP or VIP, may reduce manual effort of designing verification tools specifically for DSMPs. It will be noted that the VIP may be, for example, a designated stimuli-generator, a general stimuli-generator and a corresponding test-template outlining stimuli to be generated for the SMP, a simulation-based verification tool, a model and specification useful for model checking the SMP using a model checker, an exerciser useful for exercising a post-silicon product of the SMP, or the like. Designing a VIP may be a relatively complex task which may be particularly error prone, specifically when parallelism is involved, such as in an SMP node and in a DSMP, which may be performed by verification engineers, QA staff members, designers, or the like. Reusing existing VIPs in which significant effort was already invested, and which may have been already debugged and checked for correctness, may therefore be desired.

However, as the VIP may be configured under assumptions of symmetry or other assumptions associated with the SMP, naïve re-usage of the VIP may not be adequate. One straightforward approach may be giving the full DSMP as input to the VIP, as if it was one big SMP. However, since the private memories on each SMP are not accessible from other SMPs, they are often mapped by the VIP to the same address spaces. Thus, inputting the whole DSMP system as an SMP system is likely to result in conflicts between addresses. Overcoming this problem would require numerous modifications to the VIP.

In some exemplary embodiments, the VIP may be used to verify each SMP node of the DSMP separately. However, such a solution may not provide adequate coverage as it may not cover interesting DSMP aspects, such as sharing between two processing entities on different SMPs.

One technical solution is to partition the DSMP into symmetric sub-systems, each of which exhibits a symmetry property of an SMP. The sub-systems may be different than any of the SMP nodes (e.g., comprise only a portion of an SMP node, comprise portions of different SMP nodes, or the like) and may not directly correspond to any SMP node. The symmetric sub-systems may be provided as input to the VIP for performing verification. In some exemplary embodiments, the partitioning may be performed automatically by a computerized device thereby reducing required manual labor and probability of human error. Additionally or alternatively, automatic partitioning may allow for different partitioning with each activation of the VIP (e.g., each test generation), which may provide for better coverage and better verification process than manual partitioning, which would be performed once and provide for a static partitioning.

Another technical solution is to partition the DSMP into symmetric sub-systems, and verify them in combination by defining a Multi-SMP system based thereon.

In some exemplary embodiments, no two sub-systems may comprise the same component. Additionally or alternatively, all sub-systems, when combined together, include all components of the DSMP. It will be noted that "component" may be a portion of the local memory, a portion of the global memory, a processing entity, or the like. In some exemplary embodiments, a processing entity which is comprised of lower-level processing entities (e.g., a core comprising processors) may not be considered as a component, therefore allowing its sub-components (e.g., the processors) to be divided into different sub-systems.

One technical effect of the disclosed subject matter is to increase reusability of existing verification tools in which significant effort was invested. Additionally, as the process of the disclosed subject matter may be essentially automatically performed, another effect is a reduction in required manual effort by a verification engineer, a designer, or the like.

Another technical effect is enabling verifying the DSMP with respect to the following aspects which are generally not exhibited in an SMP:

Aspect 1: True and false sharing between processing entities of the SMP node with respect to the private memory, in case the processing entities have different access permissions to the memory (i.e., pivot and non-pivot processing entities);

Aspect 2: True and false sharing between pivot processing entities on two different SMPs on the global memory;

Aspect 3: Alternate accesses by pivot processing entities to the different memories: the private memory, and global memories on the SMP node and on other SMP node(s).

Referring now to FIG. 1A showing an illustration of a multi SMP system, in accordance with some exemplary embodiments of the disclosed subject matter. The multi SMP system comprises an SMP0 100 and an SMP1 150, each of which exhibits the symmetry property. SMP0 100 comprises Memory 110 and two cores (120, 128). Each core comprises four processors (denoted as CPU0, CPU1, CPU2 and CPU3). Each core and each processor thereof is capable of directly accessing the memory space of Memory 110. Similarly, SMP1 150 comprises Memory 160, and two cores (170, 178). In some exemplary embodiments, SMP0 100 and SMP1 150 may communicate with one another and/or with other computerized devices using some communication link.

It will be noted that although FIGS. 1A-1H disclose systems consisting of two SMP nodes having two cores, each having four processors, the disclosed subject matter is not limited to such configuration. Particularly, the disclosed subject matter may be applied on systems comprising more than two SMP nodes. Additionally or alternatively, each SMP node may comprise any number of cores or alternative processing entities that is greater or equal to two, such as two cores, four cores, eight cores, or the like. Additionally or alternatively, each core may comprise any number of lower-level processing entities, if at all. In some exemplary embodiments, SMP nodes may comprise higher level components as well.

Referring now to FIG. 1B showing an illustration of a DSMP, in accordance with some exemplary embodiments of the disclosed subject matter. The Multi SMP system of FIG. 1A is enhanced to be a DSMP. The DSMP comprises three computational units which are based on the two SMP nodes (100, 150): SMP0 100, SMP1 150, and SMP2 180, also referred to as a logical SMP.

Memory 110 is partitioned into a local partition (also referred to as private memory) and a Global Partition 192. Some processing entities are restricted access from Global Partition 192, such as Core0 120. Similarly, Memory 160 is partitioned into a local partition and a Global Partition 194.

The logical SMP (SMP2 180) is composed of portions of different SMP nodes, in particular, SMP2 180 comprises a Core1 128' of SMP0 100, Core2 170' of SMP1 150 and global partitions of the memories of the SMP nodes (192, 194) which together form a Global Memory 190 (also referred to as shard memory). It will be noted that Core1 128' is capable of accessing the global memory that is located in SMP1 150 (194), optionally in a direct manner. Similarly, Core2 170' is capable of accessing global partition 192.

In some exemplary embodiments, Core1 128', is referred to as a pivot core, or pivot processing entity, as both SMP0 100 and SMP2 180 may utilize its computational capabilities (i.e., by accessing the local partition of Memory 110 for SMP0 100 or by accessing Global Memory 190 for SMP2 180) in accordance with their respective processing load. A pivot processing entity is generally a processing entity which participates in two or more SMPs. Any processing entity which is not a pivot processing entity, such as Core0 120, is referred to as a non-pivot processing entity.

It will be noted that the logical SMPs do not necessarily exhibit the symmetry property. As an example, SMP2 180 is not symmetric, as Core 1 128' can access Local Memory 110, while Core 2 170' cannot. In addition SMP0 100 is also not symmetric, as Core1 128' can access Global Partition 192 while Core0 120 cannot.

It will be noted that in the DSMP, using four cores, three parallel computation units are defined, each having two cores, thereby the DSMP may increase utilization of the cores and may reduce their idle time.

Referring now to FIG. 1C showing partitioning of a DSMP into sub-systems, in accordance with some exemplary embodiments of the disclosed subject matter.

Memory 110 may be partitioned into portions M0-M4 (112-119), where M0 112 and M1 114 are in the local partition, while M2-M4 (116-119) are in the Global Partition 190. Similarly, Memory 160 is partitioned into portions M5-M9 (162-169), where M5-M7 (162-166) are in Global Partition 194 and M8-M9 (168-169) are in the private memory of SMP1 150. The partition of the space may be logical partitioning of address space, and may comprise consecutive or non-consecutive addresses within the memory. It will be understood that any numbers of partitions may be determined in accordance with the disclosed subject matter.

A first sub-system may be an SMP comprised by Core0 120, Core1 128', and the local memory of SMP0 (i.e., M0-M1 112-114) or a portion thereof. In some exemplary embodiments, the first sub-system exhibits symmetry as all cores are capable of accessing the entire relevant memory space. The first sub-system is useful in performing verification regarding the above-mentioned aspect 1. Similarly, a sub-system relating to SMP1 150 may be defined. In some exemplary embodiments, both sub-systems may be verified together as a multi SMP system.

A second sub-system may be Core1 128', Core2 170' and the Shared Memory (i.e., M2-M7 116-119, 162-166) or a portion thereof. In some exemplary embodiments, the second sub-system exhibits symmetry as all cores are capable of accessing the entire relevant memory space. The second sub-system is useful in performing verification regarding the above-mentioned aspect 2. In some exemplary embodiments, a multi SMP system comprising the second sub-system as well as two additional sub-systems, each comprising the remaining portions of an SMP node that are not comprised by the second sub-system (i.e., Core0 120 and M0-M1 112-114 w.r.t SMP0 100 node; and Core3 178 and M8-M9 168-169 w.r.t. SMP1 150 node) may be defined and verified.

A third sub-system may be Core1 128' and portions of both local and global partitions of Memory 110, such as M1 114, M2 116, as well as a portion of the Global Memory 194 (e.g., M5 162). The third sub-system is useful in performing verification regarding the above-mentioned aspect 3 w.r.t the pivot cores of SMP0 100. Similarly, pivot cores of SMP1 150 may be the target of verification by defining a sub-system comprising Core2 170' and M3 118, M6 164 and M8 may be defined. In some exemplary embodiments, a multi SMP system comprising the third sub-system and the additional sub-system relating to SMP1 150, as well as two additional sub-systems, each comprising the remaining portions of an SMP node that are not comprised by the second sub-system (i.e., Core0 120 and M0 112 w.r.t SMP0 100 node; and Core3 178 and M9 169 w.r.t. SMP1 150 node) may be defined and verified.

In some exemplary embodiments, sub-systems which exclude one another and are useful for verifying above-mentioned aspects 1-3 may be defined as used. In some exemplary embodiments, the sub-systems may avoid sharing components with one another, thereby enabling verification thereof by verifying a single multi SMP system.

In some exemplary embodiments, the sub-systems may comprise a first sub-system that is configured to check mixed accesses by pivot and non-pivot processing entities to regular memory areas. The first sub-system may comprise Core0 120 and a processor of Core1 128' (e.g., Core1/CPU0) and a private memory area (e.g. M0 112). The first sub-system is illustrated in FIG. 1D.

Additionally or alternatively, the sub-systems may comprise a second sub-system that is configured to check mixed accesses by pivot processing entities to both regular and shared memory areas. The second sub-system may comprise one or more processors of Core1 128' (e.g., Core1/CPU1 and Core1/CPU2), a private memory area (e.g., M1 114) shared memory areas of both types (i.e., from the SMP0 100 node (e.g., M2 116) and from SMP1 150 (e.g., M5 162)). The second sub-system is illustrated in FIG. 1E.

Additionally or alternatively, the sub-systems may comprise a third sub-system that is configured to check accesses to shared memory physically located on different SMP nodes by processing entities from the different SMP nodes. The third sub-system may comprise a processor of Core1 128' (e.g., Core1/CPU3), a processor of Core2 170' (Core2/CPU0), and shared memory areas of all types (i.e., from the SMP0 100 node (e.g., M3 118) and from SMP1 150 (e.g., M6 164)). The third sub-system is illustrated in FIG. 1F.

Additionally or alternatively, a fourth sub-system similar to the second sub-system but associated with SMP1 150 node may comprise one or more processors of Core2 170' (e.g., Core2/CPU1 and Core2/CPU2) and memory areas M4 119, M7 166 and M8 168. The fourth sub-system is illustrated in FIG. 1G.

Figure 1H:
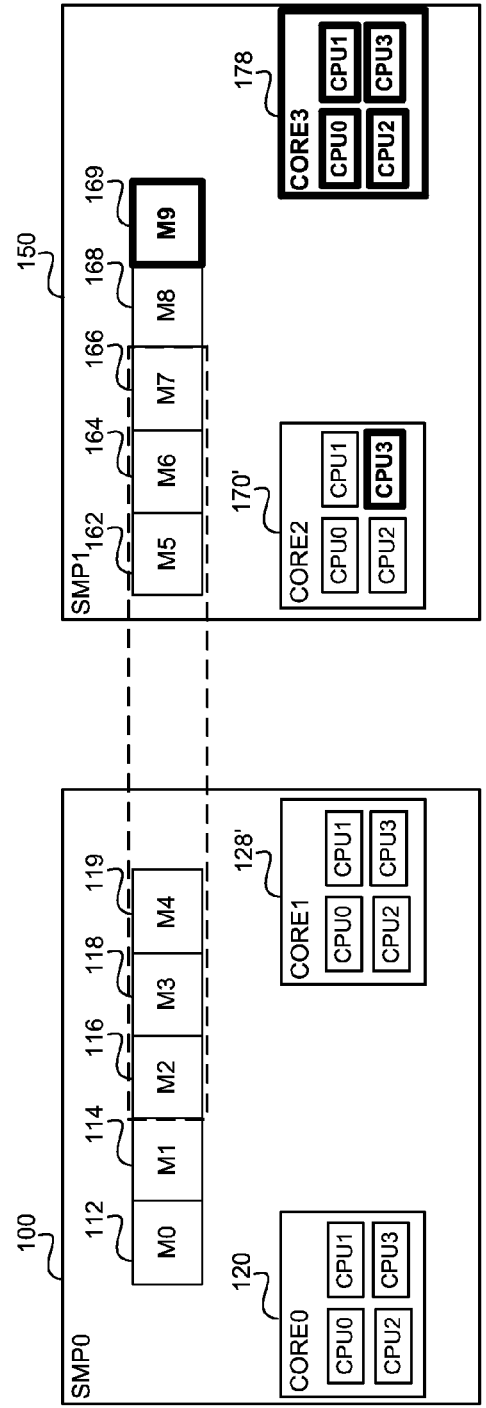

Additionally or alternatively, a fifth sub-system similar to the first sub-system but associated with SMP1 150 node may be determined. The fifth sub-system may comprise Core3 178, a processor of Core2 170' (e.g., Core2/CPU3) and private memory M9 169. The fifth sub-system is illustrated in FIG. 1H.

It will be noted that in this disclosed embodiment, the first, second, third, fourth and fifth sub-systems do not have any shared component in between them. Each sub-system by itself is a symmetric SMP, which means it can be fed into the existing VIP as an SMP. It will be noted that in some exemplary embodiments, there may be an overlap between sub-systems, and each sub-system (or a combination of sub-systems which do not have any overlap inbetween them) can be verified separately.

In some exemplary embodiments, in case the VIP generates stimuli, stimuli associated with different sub-systems may be combined into a single stimulus and used to verify the entire DSMP concurrently.

Figure 2:
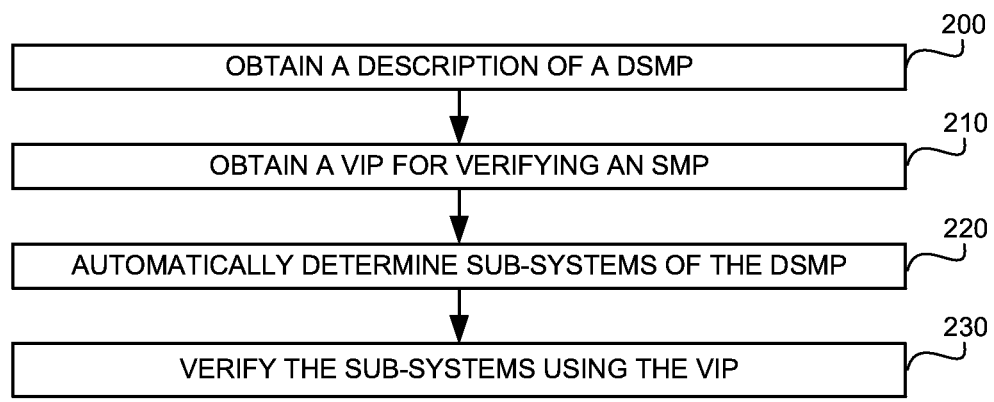
FIG. 2 shows a flowchart diagram of a method of verifying a DSMP, in accordance with some exemplary embodiments of the disclosed subject matter.

Referring now to FIG. 2 showing a flowchart diagram of a method of verifying a DSMP, in accordance with some exemplary embodiments of the disclosed subject matter.

In Step 200, a DSMP may be obtained in a digital or otherwise computer-readable format. The DSMP description may indicate the architecture of the DSMP, including but not limited to the SMP nodes, their processing entities, and memory units, address ranges of the memory, as well as access permissions by the processing entities to different portions of the memory units, or the like. The DSMP description may also indicate any logical SMPs and the components that are comprised by them.

Additionally or alternatively, the DSMP may be known to a human user, such as a designer, which may provide detailed description of the DSMP to a computer used for performing the method. Additionally or alternatively, some of the steps may be performed manually or in a semi-automatic manner. In some exemplary embodiments, the DSMP system description may be implied in a test template and may be obtained therefrom.

In Step 210, a VIP for verifying SMPs may be obtained. In some exemplary embodiments, the VIP may be a verification tool, such as a computer program designed to verify SMPs. Additionally or alternatively, the VIP may be a stimuli generator configured to generate stimuli for an SMP, such as stimuli that is useful for verifying a memory model of the SMP. Additionally or alternatively, the VIP may be a stimuli generator that is configured to generate a stimuli based on a test-template. In such a case and in some exemplary embodiments, it may be sufficient to obtain only the test-template in Step 210. In some exemplary embodiments, the test-template is based on an assumption of symmetry of the SMP. Additionally or alternatively, the VIP may be a simulation-based verification tool that is configured to use a simulator simulating a functionality of the DSMP for verifying the SMP. Additionally or alternatively, the VIP may be an apparatus such as a hardware simulator or emulator.

It will be noted that in some cases, the VIP may not be physically obtained, but rather logically obtained in the sense that the VIP may be used during the method. The VIP may be operatively coupled to a computer performing the method of FIG. 2 and may be used by the computer while performing the method.

In Step 220, sub-systems of the DSMP may be determined. In some exemplary embodiments, the sub-systems may be determined automatically. In some exemplary embodiments, each of the sub-systems may exhibit a symmetry property. In some exemplary embodiments, the sub-systems may be determining manually. In some exemplary embodiments, in a computer implemented method performing Step 220, the sub-systems may be determined manually by a user. Additionally or alternatively, the partitioning into sub-systems may be static or hard-coded into the VIP, such as for example, defined in the description of the DSMP that is used as input to the VIP.

In some exemplary embodiments, all the sub-systems may be different from all SMP nodes of the DSMP and none of the sub-systems correspond exactly to an SMP node of the DSMP. Additionally or alternatively, the sub-systems may comprise only portions of an SMP node. Additionally or alternatively, the sub-systems may comprise portions of different SMP nodes that do not entirely represent a logical SMP.

In some exemplary embodiments, a sub-system may be determined to be useful in verifying data sharing between a pivot processing entity and a non-pivot processing entity of a single SMP node. Additionally or alternatively, a sub-system may be determined to be useful in verifying data sharing between pivot processing entities of different SMP nodes that are included in a logical SMP node. Additionally or alternatively, a sub-system may be determined to be useful for verifying alternate accesses by pivot processing entities to different portions of the shared memory of the logical SMP (e.g., a first portion comprised by an SMP node comprising the pivot processing entities, and a second portion that is external to the SMP node and is comprised by a logical SMP node).

In some exemplary embodiments, no two sub-systems share any common component, thereby allowing all sub-systems to be considered as a single multi-SMP system.

In some exemplary embodiments, the automatic partitioning may be non-deterministic. Non-deterministic partitioning may increase coverage of the sub-systems, in case partitioning is performed a plurality of times. Additionally or alternatively, automatic partitioning of the DSMP into sub-systems may be performed so as to create different sub-systems each time.

In Step 230, the sub-system may be verified using the VIP. In some exemplary embodiments, each sub-system may be verified separately. Additionally or alternatively, the sub-systems may be combined into a single multi-SMP system and may be verified together. In some exemplary embodiments, the VIP may be configured to verify a multi-SMP system. Additionally or alternatively, stimuli for different sub-systems, which may be generated by the VIP with respect to the sub-system in a stand-alone configuration, may be combined together to form a stimulus for the multi-SMP system.

In some exemplary embodiments, the method or portions thereof, may be performed repeatedly. In some exemplary embodiments, Steps 220-230 may be performed iteratively so as to provide alternative sets of sub-systems to be verified in Step 230.

Figure 3:
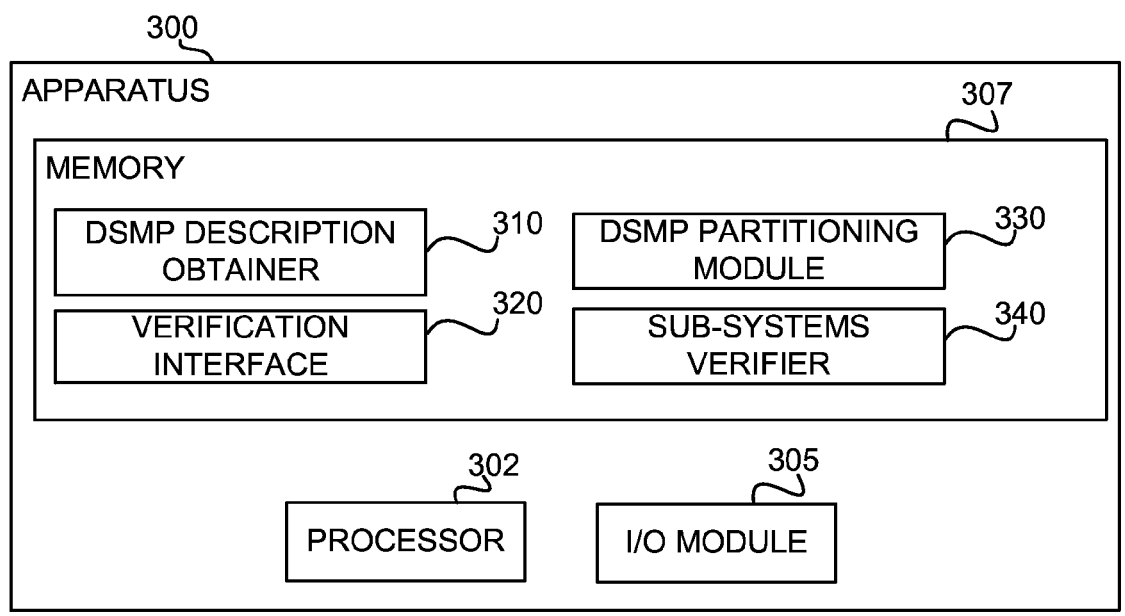
FIG. 3 shows a block diagram of an apparatus for verifying a DSMP, in accordance with some exemplary embodiments of the disclosed subject matter.

Referring now to FIG. 3 showing a block diagram of an apparatus for verifying a DSMP, in accordance with some exemplary embodiments of the disclosed subject matter.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the method of FIG. 2 or the like In some exemplary embodiments of the disclosed subject matter, Apparatus 300 may comprise an Input/Output (I/O) Module 305. I/O Module 305 may be utilized to provide an output to and receive input from a user. I/O Module 305 may be operative to provide an error report to a user, such as a model designer, a QA staff member, a verification engineer, or the like. Additionally or alternatively, I/O Module 305 may enable Apparatus 300 to be operatively coupled with a verification tool, such as a simulation-based verification tool, a hardware accelerator or emulator, third-party verification software, or the like.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIG. 2 above.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A DSMP Description Obtainer 310 may be configured to obtain a description of the DSMP, such as performed in Step 200.

A Verification Interface 320 may be configured to enable Apparatus 300 to utilize a verification tool, such as software-implemented verification tool retained in Memory Unit 307, verification tool external to Apparatus 300 and operatively coupled thereto via I/O Module 305, or the like.

A DSMP Partitioning Module 330 may be configured to partition a DSMP into sub-systems, such as performed in Step 220.

A Sub-Systems Verifier 340 may be configured to verify sub-systems of the DSMP, such as determined by DSMP Partitioning Module 330. In some exemplary embodiments, Sub-Systems Verifier 340 may be configured to reuse verification tools that are useful for SMPs, such as by employing such verification tool using Verification Interface 320. Additionally or alternatively, Sub-Systems Verifier 340 may be configured to verify each sub-system separately or all the sub-systems in combination. In some exemplary embodiments, Sub-System Verifier 340 may be configured to perform Step 230.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for verifying a Distributed Symmetric Multi-Processing system (DSMP), wherein the method is performed by a computer having a processor and memory unit,
   wherein the DSMP comprises a first SMP node and a second SMP node, wherein each SMP node of the first and second SMP nodes comprises:
      a memory that is divided into a global portion and a private portion;
   and processing entities that are divided into pivot processing entities and non-pivot processing entities,
   wherein the non-pivot processing entities of the first SMP node having access permission to the memory of the first SMP node and no access permission to the memory of the second SMP node;
   wherein the non-pivot processing entities of the second SMP node having access permission to the memory of the second SMP node and no access permission to the memory of the first SMP node;
   wherein the pivot processing entities of the first SMP node having access permission to the memory of the first SMP node and to the global portion of the memory of the second SMP node;
   wherein the pivot processing entities of the second SMP node having access permission to the memory of the second SMP node and to the global portion of the memory of the first SMP node;
   whereby the first and second SMP nodes do not exhibit an access symmetry property of having all processing entities having the same memory access permissions;
   whereby a logical SMP is formed from processing entities of the first SMP node and processing entities of the second SMP node;
   wherein the method comprising:
      determining one or more sub-systems of the DSMP, wherein each sub-system is a Symmetric Multi-Processing System (SMP) which comprises a shared memory and a set of processing entities that have the same access permissions to the shared memory, whereby each of the one or more sub-systems exhibits the access symmetry property;

wherein said determining comprises:
    determining a sub-system that is based on the logical SMP, the sub-system comprises:
        one or more pivot processing entities of the first SMP node;
        one or more pivot processing entities of the second SMP node;
        at least a portion of the global portion of the memory of the first SMP node; and
        at least a portion of the global portion of the memory of the second SMP node
        whereby the sub-system exhibits the access symmetry property; and
    verifying the DSMP using a verification tool designed to verify an SMP, wherein said verifying is performed by verifying each sub-system.

2. The computer-implemented method of claim 1, wherein none of the sub-systems correspond exactly to an SMP node of the DSMP.

3. The computer-implemented method of claim 1, wherein the DSMP comprises: a plurality of SMP nodes coupled together to form a cluster, each SMP node comprises:
    one or more processing entities; and
    memory, partitioned into a local and global partition, with the global partitions together forming a global memory accessible by processing entities of different SMP nodes of the cluster.

4. The computer-implemented method of claim 1, wherein said determining the one or more sub-systems comprises: determining a second sub-system, wherein the second sub-system comprises:
    one or more non-pivot processing entities of the first SMP node;
    one or more pivot processing entities of the first SMP node; and
    at least a portion of the local portion of the memory of the first SMP node;
    whereby the second sub-system exhibits the access symmetry property.

5. The computer-implemented method of claim 4, wherein said determining the one or more sub-systems comprises: determining a third sub-system, wherein the third sub-system comprises:
    one or more pivot processing entities of the first SMP node;
    at least a portion of the local portion of the memory of the first SMP node;
    at least a portion of the global portion of the memory of the first SMP node; and
    at least a portion of the global portion of the memory of the second SMP node;
    whereby the third sub-system exhibits the access symmetry property.

* * * * *